United States Patent [19]
Ghislain et al.

[11] Patent Number: 5,445,011
[45] Date of Patent: Aug. 29, 1995

[54] SCANNING FORCE MICROSCOPE USING AN OPTICAL TRAP

[76] Inventors: Lucien P. Ghislain, Cornell University, Clark Hall, Ithaca, N.Y. 14853-2501; Watt W. Webb, 409 Highland Rd., Ithaca, N.Y. 14850

[21] Appl. No.: 123,972

[22] Filed: Sep. 21, 1993

[51] Int. Cl.6 .......................... G01B 5/28; G01B 15/00
[52] U.S. Cl. ...................................... 73/105; 250/306; 250/307
[58] Field of Search .................. 73/105; 250/306, 307, 250/423 F; 356/256

[56] References Cited

U.S. PATENT DOCUMENTS

| | | | |
|---|---|---|---|
| 4,969,978 | 11/1990 | Tomita et al. | 250/306 |
| 4,992,659 | 2/1991 | Abraham et al. | 250/306 |
| 5,003,815 | 4/1991 | Martin et al. | 73/105 |
| 5,354,985 | 10/1994 | Quate | 250/306 |

OTHER PUBLICATIONS

Binnig et al., "Atomic Force Microscope", Physical Review Letters, vol. 56, No. 9, 3 Mar. 1986, pp. 930-933.
Schonenberger et al., "A Differential Interferometer for Force Microscopy", Rev. Sci. Instrum. 60(10), Oct. 1989, pp. 3131-3134.
Arney et al., "Formation of Submicron Silicon-on-Insulator Structures by Lateral Oxidation of Substrate-Silicon Islands", J. Vac. Sci. Technol. B 6(1), Jan./Feb. 1988, pp. 341-345.
den Boef, "Scanning Force Miscorscopy Using a Simple Low-Noise Interferometer", Appl. Phys. Lett. 55 (5), 31 Jul. 1989, pp. 439-441.
Drake et al., "Imaging Crystals, Polymers, and Processes in Water with the Atomic Force Microscope", Sciene, vol. 243, 24 Mar. 1989, pp. 1586-1589.

Primary Examiner—Richard E. Chilcot, Jr.
Assistant Examiner—George Dombroske
Attorney, Agent, or Firm—Jones, Tullar & Cooper

[57] ABSTRACT

A scanning force microscope utilizes a probe consisting of a glass stylus, or probe, positioned and oriented by an optical trap. The probe is an optically transparent cylinder having at least one tip on its axis with an apex dimension less than one wavelength of the light used for the trap. An optical displacement sensor utilizing forward scatter or an optical interferometer detects the motion of the probe caused by the force between the tip and an object to be scanned. Mutual scanning displacement between the probe and the object is carried out by moving a support stage along x/y coordinates or by movement of the light beam forming the optical trap along these coordinates. Radiation forces due to the three-dimensional intensity distribution of the light in the optical trap allow the probe to be positioned with precise control and with a low spring constant, allowing resolution in the range of $\lambda/100$, with the probe being capable of measuring forces smaller than 0.1 pN.

29 Claims, 4 Drawing Sheets

SCANNING FORCE MICROSCOPE USING AN OPTICAL TRAP

This invention was made with Government support under Grant No. DIR-8800278, awarded by the National Science Foundation. The Government has certain rights in the invention.

BACKGROUND OF THE INVENTION

The present invention relates, in general, to optical force microscopes, and in particular to microscopes in which a probe is positioned and oriented by an optical trap and is scanned across an object to be inspected.

Scanning optical microscopes conventionally include a light source, a lens to focus the light on the object to be inspected, a photo detector, and a scanning mechanism to cause relative motion between the point of focus and the object. The limit of resolution of such optical microscopes is about one-half of the wavelength of the light used; that is, about 300 nm. According to the Rayleigh criterion, two neighboring points in the object are considered to be resolved in the image when the diffraction maximum of the first point coincides with the diffraction minimum of the second point. The distance between two points in the object at the limit of resolution, for incoherent illumination and a circular limiting aperture, is about $0.61 \lambda/NA$, where NA is the numerical aperture of the focusing lens. In order to achieve high resolution in optical microscopes, then, a high numerical aperture objective lens is required. Oil immersion lenses of the kind commonly used in scanning optical microscopes can have a maximum numerical aperture of about 1.4.

Numerous attempts have been made in the prior art to increase the limit of resolution of scanning optical microscopes. One such attempt includes the use of an aperture with an entrance pupil positioned in the near field of the object, with the entrance pupil having a diameter smaller than the wavelength of the illuminating light. The light collected through the aperture by a photodetector is proportional to the transmissivity of the object at the location of the entrance pupil. The intensity of this collected light varies as the pupil is scanned over the surface of the object, and the resulting signal from the photodetector is recorded, with the record of the scan forming an image of the object. To achieve a resolution of about $\lambda/10$ with such a device requires an entrance pupil diameter of 40 nm and a separation between the entrance pupil and the object being imaged which is equal to the radius of the entrance pupil. Although such a near-field microscope has numerous advantages, its disadvantage is that the small diameter pupil has a low collection efficiency, the proximity of the pupil to the object being scanned does not permit the imaging of rough surfaces, and the aperture/object distance must be controlled by a sensitive feedback mechanism in order to avoid destructive collisions.

Another attempt to increase the resolution of microscopes is the so-called atomic force microscope which is designed to image the force between a sharp tip and an object to be inspected. Such a microscope essentially comprises a mechanical cantilevered beam carrying a sharp tip, a laser light source reflected from the cantilever, a scanner to cause relative movement between the tip and the object, and a position sensing photodetector to measure the cantilever deflection. Such an atomic force microscope provides lateral resolution approaching the atomic level (0.1 nm) on hard surfaces and a sensitivity to the force applied to the cantilever on the order of 100 pN to 1000 pN, depending on the stiffness of the cantilever and the imaging mode. The resolution of such an atomic force microscope is limited by relative vibrational motion between the tip and the object, as well as by the sharpness of the tip.

Accordingly, there is a need in the art to increase the lateral resolution available with optical microscopes by overcoming the natural limitations resulting from the dimensions of the apertures in the optical train, and to increase the force sensitivity available with force microscopes by overcoming the limitations imposed in such devices by the cantilever system.

SUMMARY OF THE INVENTION

It is, therefore, an object of the present invention to provide an improved optical microscope capable of measuring extremely small forces to provide improved sensitivity and resolution.

It is another object of the invention to provide an optical microscope capable of measuring forces on a scale approaching the molecular level.

It is still another object of the present invention to provide an optical microscope which is capable of imaging small, soft structures such as proteins and living cells through the measurement of forces in the range of about 1 pN.

It is another object of t,he present invention to provide a scanning force microscope utilizing an optical trap for positioning a dielectric probe in an aqueous solution by means of a light beam from a focused laser.

It is still another object of the invention to provide an improved scanning force microscope having an elongated dielectric particle aligned with a focused laser beam and held in a stable position within an aqueous solution by radiation forces.

A still further object of the invention is the provision of an optical force microscope utilizing an optical trap in which is located an elongated probe sensitive to adjacent objects to be imaged and including a displacement sensor for detecting the motion of the probe caused by the force between the probe and the object to be scanned.

A still further object of the invention is a provision of an optical force microscope having an optical trap in which is located a probe, the trap being positioned adjacent to an object to be imaged and being relatively movable with respect to the object so as to scan the object.

The optical scanning force microscope of the present invention consists of an optical trap which supports, positions and orient a particle such as a tiny stylus, or probe, which may be an optically transparent cylinder having at least one tip on its axis with an apex dimension less than one wavelength of the light used for the trap. The optical trap is a laser beam focused to produce an intense spot of light which pulls-in the probe and traps it, the radiation forces due to the three-dimensional intensity distribution of the light at the focus serving to position the probe in the trap with precise control and with a low spring constant. When the tip of the probe is very near to, or touches an object to be imaged, a small force tends to push the probe a small distance away from the center of the trap. This motion is measured with high sensitivity using, for example, a laser interferometer or a forward scatter sensor so that as the probe is scanned with respect to the object, the shape of the object surface can be measured with a high degree of accuracy. The sharp tip of the probe can be held tightly enough by the trap to resolve distances as small as 10 nm so that objects as much as 100 times smaller than the wavelength of the light used to produce the laser optical trap can be measured. The probe is sensitive to forces of about 1 pN so that soft structures such as the proteins and living cells can be detected and measured without causing damage, the optical trap effectively serving as a microscopic optical spring. The microscope scans the probe with respect to the object, and the measured deflection of the probe during the scan is converted into electrical signals which can be converted into an image of the surface and displayed on a video screen.

To measure the force between the tip and the object with a high degree of spatial resolution, it is necessary to hold the probe in a fixed orientation, with its tip pointing at the object. To do this, the probe may be designed to have a prolate shape which can be held by a pair of optical traps, one at each end, so that as the probe is scanned across the surface to be imaged, it will move axially rather than tilting, providing a higher resolution image of the surface.

A critical element of the scanning force microscope is its "spring". To obtain the maximum deflection for a given force, and thus to obtain maximum sensitivity, a spring constant that is as soft as possible is required. Mechanical cantilevers with spring constants of 1 N/m to 0.1 N/m have been used to detect forces down to about $10^{-1}$ N. By use of an optical trap with an axial optical spring constant in the range of $10^{-4}$ to $10^{-5}$ N/m for a two micrometer spherical particle in a 150 mW beam, the detection of forces as small as $10^{-12}$ to $10^{-13}$N can be achieved in an aqueous medium. However, a stiff spring with a high resonance frequency is necessary to achieve a fast scanning rate. For mechanical cantilevers in air or vacuum, the resonance frequency is $\omega_r = (k/m)^{\frac{1}{2}}$ where k is the spring constant and m is the mass of the cantilever. Maintaining a high resonance frequency as the spring constant decreases requires that the mass also decrease. In a liquid medium, the oscillation amplitude near the resonance frequency is attenuated by viscus damping. A harmonically bound over-damped particle has a corner frequency $w_c = k/\lambda$, where k is the spring constant and $\lambda$ is the viscus drag coefficient. For a sphere, the Stokes drag coefficient is $\lambda = 6\pi n r$, where n is the medium viscosity and r is the radius. Thus, the optical trap of the present invention provides a low spring constant and retains, in water, a corner frequency approaching 1 kHz due to the small size of the probe particle relative to typical cantilevers.

The radiation pressure on a particle in the optical trap is derived from a three-dimensional intensity distribution which exists near a laser beam focus. This intensity distribution has a Gaussian intensity profile, with the pressure being due to the refraction of the light rays at the surface of the particle and to the gradient force due to fluctuating dipoles induced by the intense electric field near the beam focus. In addition, a scattering force on the particle exists and is proportional to the optical intensity. This force points in the direction of the incident beam (along the z-axis). A restoring force component transverse to the z-axis is proportional to the radial intensity gradient of the light near the beam focus; points toward it. As a result of these forces, the particle is trapped at a position of stable equilibrium in three dimensions just downstream along the beam from the focus. The location of a high intensity light region extending along the axis in the region of the focal plane of a beam diffracted by a circular aperture defines a focal volume with an aspect ratio of about three to one. A cylindrical particle with dimensions comparable to this focal volume will be positioned in and held by the high intensity region and will be oriented longitudinally along the beam axis by radiation forces.

In accordance with the invention, the cylindrical particle in the optical trap is used as a force sensing probe for imaging the surface of an object. To accomplish this, the probe is moved to a position very close to or in light contact with the surface of the object to be imaged and either the object or the optical trap is moved to produce a relative scanning motion. Variations in the surface of the object being scanned produce corresponding displacements of the probe by physical contact with the surface, with the force required to displace the probe being dependent on the spring constant of the optical trap.

A measurement of particle displacement can be carried out, in one embodiment of the invention, by means of a two-beam polarizing laser interferometer which consists essentially of a laser source, a pair of birefringent prisms, and a pair of photodetectors. The incident laser beam is circularly polarized, and is sheared by the prisms to provide two displaced beams having perpendicular polarization. A probe displacement near the foci of the two displaced beams causes a relative phase shift between the beams, and the beams are then returned through a birefringent prism to a polarized beam splitting cube, which produces two perpendicular components of the displaced beams. These components are directed to a pair of photodetectors to produce corresponding electrical outputs which are electronically subtracted and normalized to provide an interferometer difference signal. This signal is proportional to the relative phase shift between the two beams and thus is proportional to the displacement of the probe. By recording and/or displaying variations in the displacement of the probe as the probe is scanned with respect to an object surface, an image of the surface is obtained with extremely high resolution.

In another, preferred, form of the invention, the particle displacement caused by scanning the force sensing tip relative to an object surface is measured using the light beam which forms the optical trap. A laser displacement sensor consists of a light focusing lens for collecting the beam transmitted through the sample housing and a photodiode having a limiting aperture positioned in front of the active area to truncate the light beam collected by the lens. The collecting lens produces a conjugate focus at a predetermined position and the photodiode and limiting aperture are positioned with an offset from the conjugate focus. For small displacements near the laser beam focus the optically trapped particle acts as a weak positive lens to deflect the trapping beam and to shift the position of the conjugate focus. As a result, the electrical signal output from the photodiode, which varies with the optical power passed by the limiting aperture, is directly related to the deplacement of the sensing particle relative to the focal spot and can be used to measure the profile and physical properties of the sample.

Accordingly, the present invention is a scanning force microscope which circumvents the lateral resolution limits of conventional optical microscopes through the use of a probe in an optical trap, with the probe having a tip positioned and oriented near an object to be measured. The force between the tip of the probe and the object displaces the probe axially by an amount which depends on the contour of the surface of the object at the location of the tip. An optical displacement sensor then detects the axial displacement of the probe and produces a corresponding electrical signal. When the probe is scanned along the surface, the force varies according to the topography of the object and the resulting output signal represents an image of the object surface which can be recorded and displayed.

The lateral resolution provided by the present invention is substantially improved over that of optical microscopes, and the device of the invention provides an axial displacement sensitivity better than 1 pN. The minimal detectable force is limited by the thermal vibration of the probe and is in the range of 1 pN, although this can be decreased when the probe is driven to oscillate at its corner frequency.

The probe preferably consists of a transparent prolate body with dimensions substantially the same as the wavelength of the light forming the optical trap, the probe having a tip with an apex dimension substantially smaller than the wavelength. Furthermore, the distance from the tip to the object, or sample, being imaged is small compared to the wavelength of the light so that the probe operates in the "near field" of the object. In a preferred form of the invention, a cylindrical dielectric probe is supported and oriented by two optical traps displaced along the axis of the probe and formed by a beam which has been axially sheared to provide two foci. The sheared trapping beams can also comprise a two beam interferometer for detection of probe displacement in the direction of the axis.

In an alternative embodiment, the microscope comprises a probe oriented by the asymmetric intensity distribution of a single optical trap, with a second laser beam being used for detection of probe displacement.

BRIEF DESCRIPTION OF THE DRAWING

The foregoing, and additional objects, features, and advantages of the present invention will become apparent to those of skill in the art from a consideration of the following detailed description of preferred embodiments thereof, taken in conjunction with the accompanied drawings, in which.

DESCRIPTION OF PREFERRED EMBODIMENTS

Figure 1:
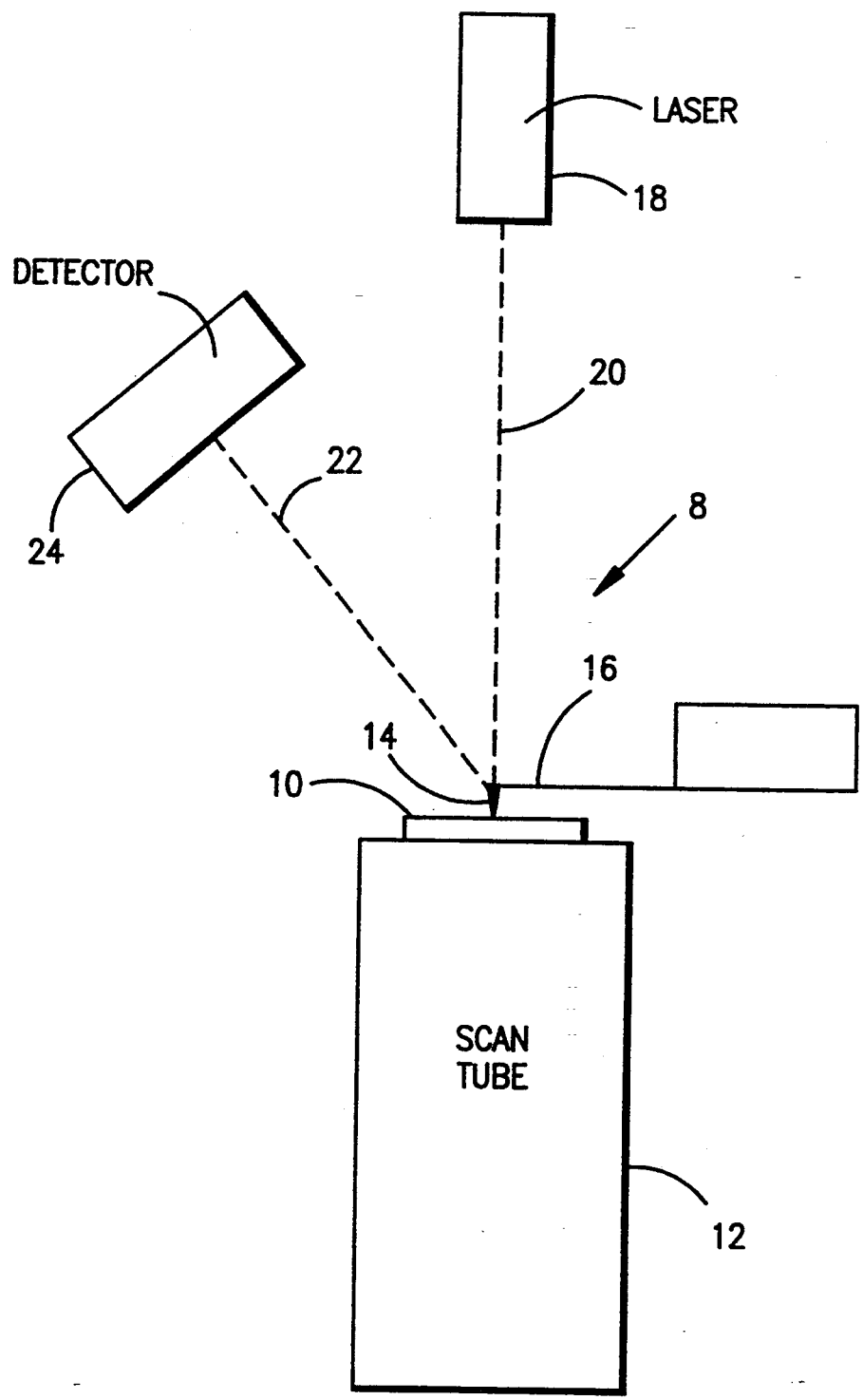
FIG. 1 is a simplified diagrammatic illustration of a prior art atomic force microscope.

A typical prior art scanning force microscope 8 is depicted in FIG. 1, wherein a Sample 10 is mounted on a piezoelectric scan tube 12. A scan tip 14 is mounted on the end of a cantilevered arm 16 and a laser source 18 directs a laser light beam 20 onto the top of the arm 16 at the tip 14. The sample 10 is positioned under the tip 14 and the scan tube 12 is driven in a raster scan movement with respect to the tip. The tip 14 moves up and down as it follows the surface contours of the sample, and the reflected light beam 22 is deflected, with the deflection being measured by an optical detector 24.

Figure 2:
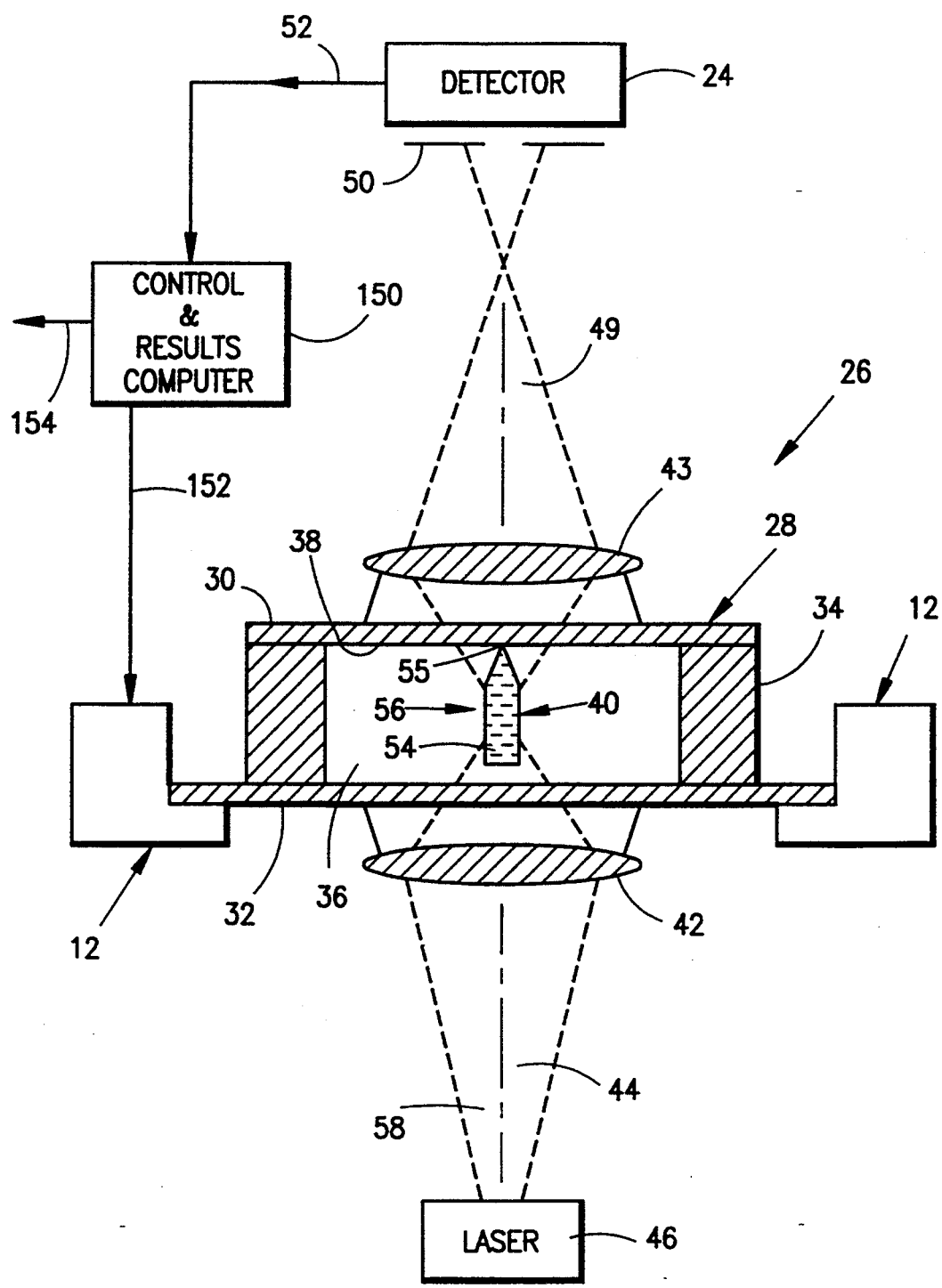
FIG. 2 is a diagrammatic illustration of a scanning optical force microscope in accordance with the present invention.

Turning now to a detailed consideration of the present invention, there is illustrated at 26 in FIG. 2 a scanning optical force microscope which incorporates many of the elements of the conventional optical microscope of FIG. 1, and which will be similarly numbered, but which also includes the features of the present invention. The apparatus includes a scanning stage 12 which is movable in a horizontal x-y plane and which is also movable along a vertical z-axis and which may be driven, in conventional manner, by piezoelectric drivers. The scanning stage 12 carries a sample housing or cell 28, which consists of, for example, two glass cover slips 30 and 32 separated by spacers 34. The sample cell has a chamber 36 which is filled with a fluid having a predetermined refractive index and which contains an object, or sample, the surface 38 of which is to be imaged by a probe 40.

The stage 12 is a part of an inverted optical microscope having condenser and objective lenses 42 and 43, respectively, located on opposite sides of the scanning stage 12. A beam of light 44 is directed into the microscope from a diode-pumped Nd:YAG laser 46 at a wavelength of, for example, 1064 nm. The beam 44 may be directed by way of a mirror 48, shown in FIG. 3, to the condenser lens 42, which is a high numerical aperture (NA=1.25) oil immersion objective and which fOCUSElS beam 44 upwardly to the diffraction limit in the sample cell 28. The light passes through the sample to the second microscope objective lens 43 which directs the transmitted light 49 through a limiting aperture 50 and to the photodetector 24. The photodetector measures the transmitted light intensity and produces corresponding output signals on line 52 for recording and display.

As illustrated in FIG. 2, the probe 40 includes a body portion 54 and a tip 55, the body portion being generally prolate with an overall length and diameter about the same as the wavelength of the light in beam 44. The probe tip 55 has an apex dimension substantially smaller than the wavelength. The probe may be a shard of glass, for example, or may be some other dielectric material having a refractive index somewhat greater than the refractive index of the fluid medium in the chamber. In a preferred form of the invention, the probe is produced by a microfabrication process such as that described by Arney et al, *Journal of Vacuum Science Technology B*, Volume 6, pages 341–345 (1988). Such a probe is located in the fluid contained in chamber 36, for example, and can be captured in the focal region 56 of the beam 44 within cell 28, the focal region thus serving as an optical trap.

The laser light in focal region 56 has an intensity which varies along the axis 58 of the beam in a Gaussian pattern in the cell 28, and serves as an optical trap for the probe particle 40. This intensity pattern holds the probe in axial alignment with the axis 58 of the beam. The location of the focal region 56, and thus of probe 40, is determined by the focus of condenser lens 42. The surface 38 to be scanned can be moved vertically along axis 58 (in the z-direction) or in the x-y plane with respect to the location of probe 40 by motion of the scanning stage 12 in the x, y, and z directions. In this way, motion of the stage causes the surface 38 to be brought close to the tip and to move past the tip 55 for scanning and imaging purposes.

By adjustment of the scanning stage 12, the tip 55 of the probe can be brought into light contact with the surface 38. Thereafter, motion of the surface with respect to the probe in the x-y plane will cause z-direction displacement of the probe as it follows the contour of surface 38, this probe displacement representing the topography, or contour, of the surface. The motion of the probe is monitored optically, in the embodiment of FIG. 2, by measuring the amplitude of forward-scattered light 49 passing through objective lens 43 and aperture 50 to detector 24. Photodetector 24 is positioned out of focus to record a fraction of the power of the laser light which is collected by objective 43, and the photodetector produces an output signal on line 52 which represents variations in the position of probe 40 as the probe is scanned with respect to surface 38.

Figure 3:
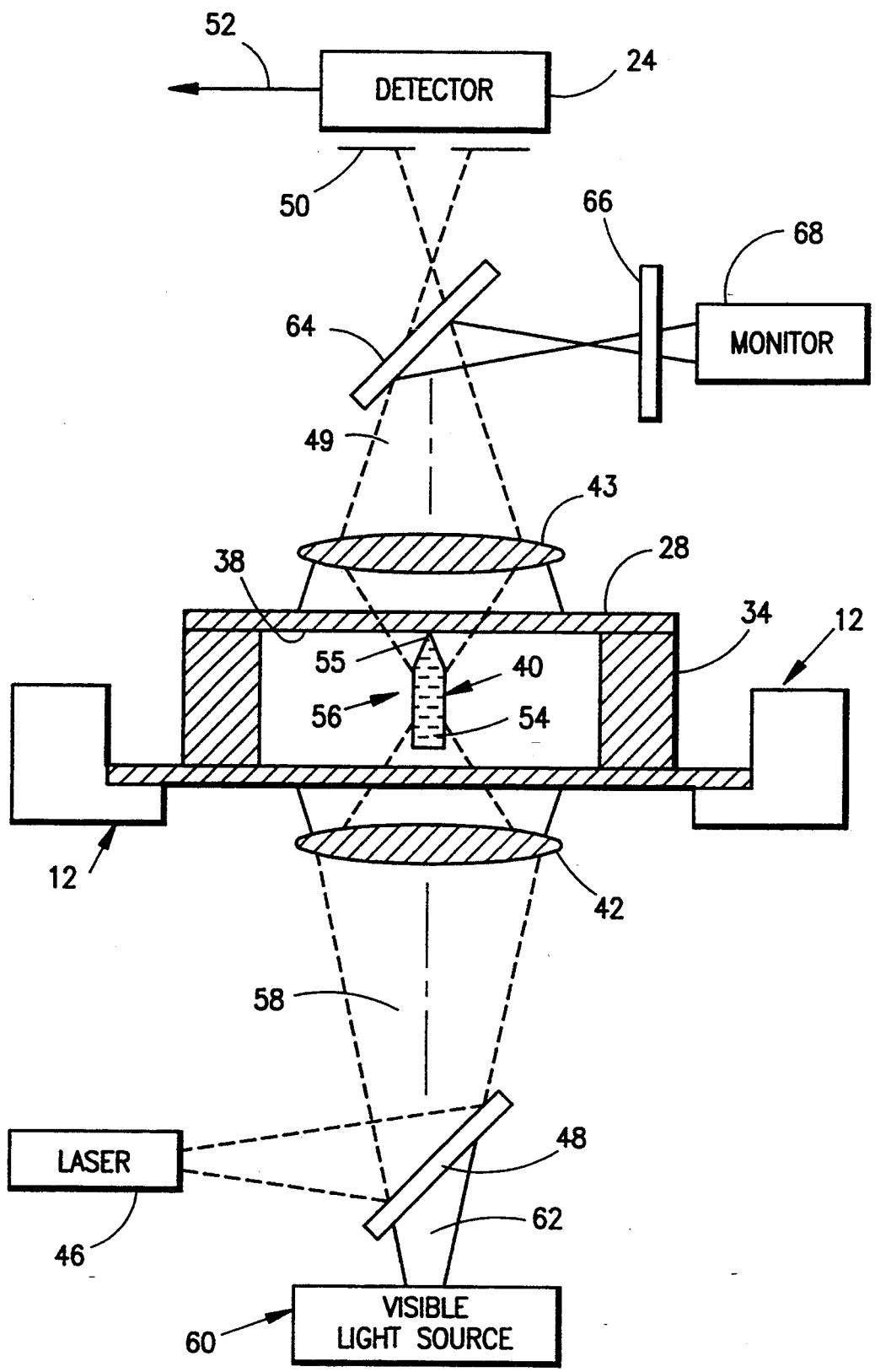
FIG. 3 is a diagrammatic illustration of a second embodiment of the scanning optical force microscope in which a scan mirror is used for horizontal raster scanning of the laser beam and including a viewer for viewing the sample and sensing probe by conventional optical microscopy.

It will be noted that, if desired, the scanning stage 12 can be held stationary, and the location of the probe with respect to the sample varied by moving beam 44 in the x and y directions, as by way of the scanning mirror 48 shown in FIG. 3. In addition, the location of the probe with respect to surface 38 can be varied in the z-direction by varying the distance between the focal region 56 and the surface 38.

As illustrated in FIG. 3, the probe 40 in the optical trap 56 can be viewed by illuminating it by a visible light source 60 which directs a light beam 62 through mirror 48 to the condenser 42, which focuses the light on the probe 40. The visible light passes through cell 28 to objective 43 and then is directed by way of a second mirror 64 and a laser blocking filter 66 to a monitor 68.

Figure 4:
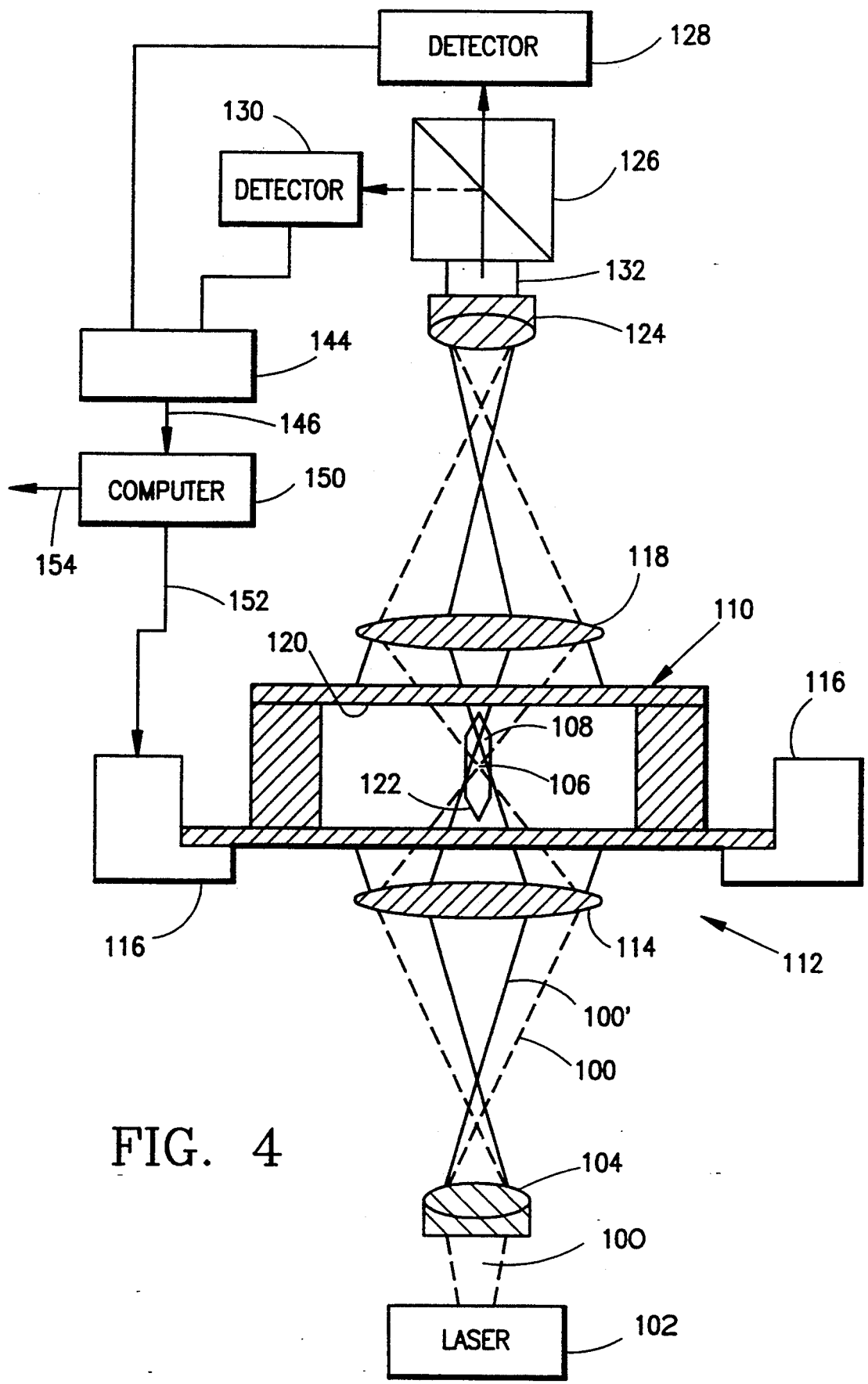
FIG. 4 is a diagrammatic illustration of a third preferred embodiment of the scanning optical force microscope utilizing two optical traps.

A preferred embodiment of the invention is illustrated in FIG. 4. This device is similar to that of FIG. 2, but instead of a single focus 56 for supporting the probe 40, a double focus is provided, with the two foci being spaced along the axis of the beam by a small amount. Thus, a beam of light 100 generated by a laser 102 is directed through a birefringent lens 104, which is calcite, for example, to provide two slightly displaced foci 106 and 108 in a sample cell 110. The calcite lens axially shears the beam 100 and produces two beams 100 and 100' which are supplied through a conventional optical microscope, generally indicated at 112 and including an oil or water immersion objective 114, a scanning stage 116, and a second objective 118. An object or sample to be imaged, indicated at 120, is carried in cell 110, as is a probe 122, the probe being located in an optical trap defined by foci 106 and 108. The vertical length of the probe body is comparable to the separation between foci 106 and 108 so that the probe is held at two spaced locations to reduce tilting of the probe during scanning.

The trapping beams 100 and 100' after passing through the sample 120, are collected by the objective 118 and are sent by way of a second birefringent lens 124 to a polarizing beam splitting cube 126, which incorporates two photodiode detectors 128 and 130. The second birefringent lens 124 compensates for the effect of the first, receiving the beams 100 and 100' and generating an interference beam 132 which is supplied to the beam splitter 126. Differences in the two beams 100 and 100' caused by axial motion of the probe 122 along the common axes of the two beams produces at the outputs of the photodiodes 128 and 130 difference signals which are supplied to suitable differential circuitry 144 to thereby produce an output on line 146 which is proportional to the displacement of the probe. As previously discussed, this output signal is then used to produce an image of the surface of sample 120 as the probe is scanned.

Scanning of the probe 122 is easily achieved by moving the stage 116 in the x-y plane with respect to the microscope further the probe may be moved vertically with respect to the surface of sample 120 by motion of the scanning stage 116 in the z direction. With the illustrated device, the displacement of the probe varies according to variations in the surface of the sample 120, with axial displacement sensitivity being better than $10^{-9}$ m. The lateral resolution achieved by this device is about 10 nm, or $\lambda/100$. The minimum detectable force is smaller than 1 pN.

A scanning force microscope conventionally includes a computer system 150, as illustrated in FIGS. 2 and 4, which drives the scan stage 12 in its scanning functions by way of line 152 and which also receives data from the detector 24 (or detectors 128 and 130) relating to the position of the tip 55 of probe 40 on the sample 38 (or the tip of probe 122 on sample 120) by way of line 52 (or line 146) and provides output information on line 154. The computer system can sense from the signal on the detector output line 52 an initial operating point. Once this is set, the system can scan the tip 55 across the sample 38 to determine the topography of the surface of the sample. This is done by holding the axial (or vertical) position of the scanning stage 12 constant, for example, and detecting changes in the axial position of the probe 40 during the scanning in the x-y plane, as determined from the optical power collected by the detector 24. In another imaging mode the axial position of the probe 40, and therefore the optical power arriving at the detector 24, is kept nearly constant by using the signal from the detector 24 in a feedback loop to control the axial position of the sample. The sample position is controlled by using the scan stage 12 or the focus control of the optical microscope to move the sample vertically to compensate for the surface contours over which the probe is being scanned.

As discussed above, the critical element of the microscope of the present invention is the optical force transducer which replaces the mechanical cantilever beam of conventional atomic force microscopes with an optical spring system comprising a dielectric probe in an optical trap. Viscous forces which limit the motion of the probe decrease linearly with the size of the probe. The stiffness of the optical spring is sensitive to the size of the probe, reaching a peak when the probe dimension is about equal to the size of the beam intensity profile. The optical spring stiffness and the gradient force are maximized when the probe volume is about equal to the focal volume of the laser beam. Therefore, providing an optical spring system with the maximum corner frequency requires a probe having dimensions determined by the width of the beam intensity profile; that is, about $\lambda/2$ NA. Due to the small size of this probe, the optical spring system provides a stiffness in the range of 0.1 pN/nm, with a corner frequency near 10 kHz for an incident beam power of 1 W. Displacements as small as $10^{-10}$ m can be detected with a two beam interferometer, with the force required to produce this displacement being about $10-14$N. In practice, the minimum detectable force is limited by thermal excitation at room temperature to about 0.1 pN, although this can be reduced by driving the probe near its corner frequency.

The highest lateral resolution of the microscope of the present invention is achieved when the stiffness of the optical spring in a direction transverse to the axis of the beam forming the optical trap is a maximum. Near the focus of the beam (56 in FIG. 2) the width of the Gaussian beam intensity profile in the radial direction (perpendicular to the beam axis) reaches a minimum which is typically less than a wavelength and is smaller than the width of the intensity profile in the direction of the axis, which may be 1–3 wavelengths, for example. For an incident beam power of 1 W, a probe having the optimum radius will result in an optical spring with a stiffness greater than 1 pN/nm. Thermal energy of the probe at room temperature limits the lateral resolution to about 10 nm.

The scanning rate of the probe relative to the surface of the object being imaged is limited by the critical speed of the optical trap. This speed is determined by the restraining force applied to the probe due to the viscosity of the medium, which force increases with scanning speed, and by the optical gradient restoring force due to the laser beam, which reaches a threshold above which the probe escapes from the trap. For an incident beam power of 1 W, the threshold force for causing the probe to escape is greater than 100 pN and the critical speed in a water medium is greater than 0.1 cm/s. This scanning rate is comparable to that of state of the art scanning probe microscope.

In the preferred form of the invention, the laser beam which produces the optical trap also forms the optical displacement sensor. The power of the portion of the trapping laser beam which is scattered by the probe is collected by a second objective lens and monitored by a photodiode, as described with respect to FIG. 2. This power is linearly related to probe displacement near the beam focus. The alternative embodiment using the two-beam interferometer, described with respect to FIG. 4, utilizes two birefringent lenses to produce axial shearing, resulting in two foci spaced apart in the direction of the microscope axis, with each focus forming an optical trap. The generally cylindrical probe is confined by both optical traps, reducing the required aspect ratio of the probe and insuring that it is aligned with the laser beam and that the tip points at the object to be scanned. Furthermore, when the axial shearing interferometer is selective for axial displacement, the difference signal is proportional to the force between the tip and the object. For large forces, or poor confinement of the probe transverse to the axis, the difference signal will include contributions from displacements in other than the axial direction.

The interferometer displacement signal can be contaminated by phase shifts due to optical path length variations in the object, although the sensitivity of the two-beam interferometer for the displacement of objects which are not near the foci is attenuated. Accordingly, a tip attached to a cylindrical probe body portion, with the tip having a length comparable to the wavelength of the laser source, provides a separation between probe and object that is sufficient to minimize the effect of relative phase shifts due to the object.

The lateral resolution (10 nm) provided by the optical force microscope of the present invention compares favorably with conventional optical microscopes which have a lateral resolution of about 200 nm. The resolution of the present microscope is about one order of magnitude larger than the resolution of atomic force microscopes on rigid surfaces (0.1 nm) and is comparable to that obtainable with deformable samples. However, the present invention provides a sensitivity to small forces more than an order of magnitude greater than that available with atomic force microscopes at a corner frequency near 10 kHz. This improvement is a consequence of the small size of the probe relative to the mechanical cantilever beam.

Although the present invention has been described in terms of preferred embodiments, it will be apparent to those of skill in the art that variations and modifications can be made without departing from the true spirit and scope thereof, as set forth in the following claims.

What is claimed is:

1. An optical force microscope comprising:
   a sensing probe;
   a laser light source generating a light beam at a predetermined wavelength, said light beam having an axis extending in the direction of beam propagation;
   means for focusing said light beam with sufficient convergence to generate at least one gradient force optical trap at a beam focal region;
   a sensing probe having dimensions comparable to the size of said focal region, said probe being carried by said optical trap at a position of local stable equilibrium near the beam focal region of said laser light source, said optical trap providing three dimensional confinement and accurate positioning of said sensing probe; and
   a light detector means disposed for receiving laser light directly related to displacement of said probe relative to the focal region of said laser light source and outputting an electrical signal directly related to the power of said received laser light.

2. The microscope of claim 1, wherein said light detector means comprises:
   a light focusing lens collecting the light beam emitted by said laser light source after it passes through said optical trap to thereby produce a conjugate focus at a predetermined position; and
   a photodiode having a limiting aperture positioned closely adjacent to said predetermined position with said limiting aperture truncating the light beam collected by said light focusing lens.

3. The microscope of claim 2, wherein said light detector means is disposed with an offset from the position of said conjugate focus.

4. The microscope of claim 2, wherein said light detector includes means responsive to the intensity of the light passed by said limiting aperture to produce a corresponding electrical signal outputs.

5. The microscope of claim 1, further including:
   a housing having walls composed of a generally transparent material;
   a fluid medium having a predetermined refractive index contained within said housing; and
   wherein said probe is immersed in said fluid medium, said probe being composed of a dielectric material having a refractive index somewhat greater than the refractive index of said fluid medium.

6. The microscope of claim 5, wherein said probe, said focusing means and said light detector means are mounted together and comprise a sensing unit, said apparatus further comprising,
   scan stage means for creating relative transverse raster scan movement between a sample and said sensing unit.

7. The microscope of claim 1, wherein said probe comprises a generally non-spherical, prolate body having a longitudinal axis which is oriented substantially parallel to said beam axis and having a sharp tip with an apex dimension substantially less than the wavelength of said laser light source.

8. The microscope of claim 1, further comprising:
a second light beam focused by said focusing means to generate a second optical trap at a second beam focal region.

9. The microscope of claim 8, wherein said first and second focused light beams are coaxial, wherein said second optical trap is disposed with a paraxial offset from said first optical trap, and wherein said probe is located in both said optical traps to thereby orient the longitudinal axis of said probe substantially parallel to the axis of said light beams.

10. The microscope of claim 1, wherein said laser light source generates a light beam having two polarization components, and wherein said light focusing means comprises a lens fabricated from a birefringent material having substantially different refractive indices for two polarization components of an incident light beam whereby said light focusing means forms from said light beam at least two foci offset in the direction of the axis of said light beam thereby generating two optical traps with axial shear equal to the magnitude of said offset.

11. The microscope of claim 10, wherein said probe has an aspect ratio matched to said axial shear.

12. The microscope of claim 10, wherein said focused light beam comprises a pair of displaced, focused light beams having a predetermined phase relationship, displacement of said sensing probe producing a relative phase shift between said light beams; and
wherein said electrical signal output by said light detector means varies as a function of the phase relationship between said first light beam and said second light beam.

13. The sensing apparatus of claim 1, further including means for producing relative motion between said probe and a sample, whereby displacement of said probe during such relative motion produces an electrical output signal from said detector which is a measure of a selected property of said sample.

14. The sensing apparatus of claim 13, wherein said beam focal region extends along said light beam axis for confining said probe and aligning it with said axis.

15. The sensing apparatus of claim 14, wherein said light detector is located to receive light scattered by said probe, the intensity of said scattered light varying with the displacement of said probe in said optical trap.

16. The sensing apparatus of claim 1, further including means for focusing a second light beam with sufficient convergence to generate at least a second gradient force optical trap at a beam focal region coaxial with said first optical trap, said light detector means including an interferometer responsive to changes in the phase relationship of said light beams caused by displacement of said probe relative to said optical traps.

17. An optical force microscope, comprising:
a fluid chamber adjacent a sample to be sensed;
a sensing probe located in said chamber and supported by said fluid;
a laser light source producing a light beam having an axis of propagation;
means focusing said laser light beam at a focal region in said fluid to produce an optical trap which confines said probe coaxially with said light beam and positions the probe in close proximity to said sample; and
detector means positioned to receive laser light scattered from said probe for determining displacement of said probe.

18. The optical force microscope of claims 17, wherein said detector is coaxial with said axis of propagation.

19. The optical force microscope of claim 17 further includes scanning means for producing relative motion between said probe and said sample, said probe being displaced along said axis by characteristics of said sample to vary the light received by said detector, whereby characteristics of said sample are measured by said detector.

20. An optical scanning force microscope sensitive to small forces, comprising:
a housing having walls composed of an optically transparent material;
a fluid medium within said housing;
a laser light source generating a light beam at a predetermined wavelength;
means for focusing said light beam with sufficient convergence to generate at least one gradient force optical trap at a predetermined focal region within said fluid medium;
a probe particle immersed in said fluid medium and having a generally non-spherical, prolate shape carried by said optical trap at a position of stable local equilibrium near the focal region generated by said laser light source, said probe having dimensions comparable to the size of said focal region and having a sharp tip with an apex dimension substantially less than the wavelength of said laser light source, said optical trap providing three dimensional confinement and accurate positioning of the probe;
a light detector disposed for receiving laser light directly related to the displacement of the sensing probe relative to the focal region said laser light source and outputting an electrical signal directly related to the power of said received laser light, the detector including a lens collecting the beam emitted by said laser light source and producing a conjugate focus at a predetermined position, the detector further including a photodiode having a limiting aperture truncating the light beam collected by said light focusing lens;
a scan stage means for creating transverse scan movement supporting said housing closely adjacent to said means focusing said light beam; and
vertical position adjustment means for adjusting the position of said probe tip.

21. The scanning force microscope of claim 20, further comprising:
computer control means connected to said light detector, to said scan stage means and to said vertical position adjustment means for adjusting the spacing between said probe tip and a sample surface until a change in said electrical signal output by said light detector means indicates a change in the collected light power corresponding to a displacement of said sensing probe within said optical trap and for scanning the sensing probe over a sample surface while keeping collected light power constant by changing the vertical position of the sample surface relative to said optical trap as the sample is scanned relative to said sensing probe.

22. The scanning force microscope of claim 20 wherein:
said vertical position adjustment means comprises adjustable means whereby said light focusing means can be moved up and down with respect to said housing container.

23. The scanning force microscope of claim 20, further comprising:
computer control means connected to said vertical position adjustment means for adjusting the position of the focal region of said laser light source to thereby adjust the spacing between the tip of said probe and a sample surface until a change in said electrical signal output by said light detector means indicates a change in the collected light power corresponding to a displacement of said sensing probe within said optical trap and for scanning the probe with respect to the sample surface while keeping collected light power constant by changing the position of the focal region as the probe is scanned.

24. In a method for sensing displacement of a sensing probe in a scanning force microscope, comprising the steps of:
dispersing multiple sensing probes in a fluid medium contained within a housing;
generating a laser light beam at a predetermined wavelength:
focusing said light beam with sufficient convergence to generate at least one gradient force optical trap in a predetermined region within said fluid medium to produce stable, three dimensional confinement and accurate positioning of one of said sensing probes near a sample surface to be sensed;
disposing a light detector to receive laser light from said laser source scattered by said sensing probe in said optical trap;
producing an electrical signal from said detector directly related to the power of said received laser light, said electrical signal being directly related to the displacement of the sensing probe relative to the optical trap;
scanning the sensing probe over the sample surface while operating the laser light source; and
determining from said electrical signal physical properties of the sample.

25. The method of claim 24 wherein the step of disposing a light detector to receive laser light from said laser source comprises:
collecting, by a light focusing lens, the beam emitted by said laser light source to produce a conjugate focus at a predetermined position; and
locating a photodiode having a limiting aperture closely adjacent to said predetermined position, with said limiting aperture truncating the light beam collected by said light focusing lens.

26. The method of claim 25 wherein the step of determining the physical properties of the sample comprises measuring the electrical signal output by said light detector to thereby measure displacement of said conjugate focus related to the displacement of said sensing probe within said optical trap.

27. The method of claim 24, further comprising the steps of:
adjusting the spacing between the tip of said sensing probe and the sample surface until a change in said electrical signal indicates a change in the collected light power corresponding to a displacement of said sensing probe within said optical trap; and
scanning the sensing probe over said sample surface while keeping collected light power constant by changing the vertical position of the sample surface relative to said optical trap.

28. The method of claim 24, further comprising the steps of:
adjusting the position of the optical trap produced by said laser light source by adjusting the focusing of the beam with respect to said housing container.

29. The method of claim 24, further comprising the steps of:
adjusting the position of the optical trap produced by said laser light source to thereby adjust the spacing between the tip of said sensing probe and the sample surface until a change in said electrical signal from said light detector indicates a change in the collected light power corresponding to a displacement of said sensing probe within said optical trap; and
scanning the sensing probe over said sample surface while keeping collected light power constant by changing the position of the optical trap as the sensing probe is scanned relative to said sample surface.

* * * * *